Aug. 5, 1969
A. J. COLE
3,459,593
NONBLOCKING ELECTROSTATIC SHEETS
Filed May 25, 1966
6 Sheets-Sheet 1
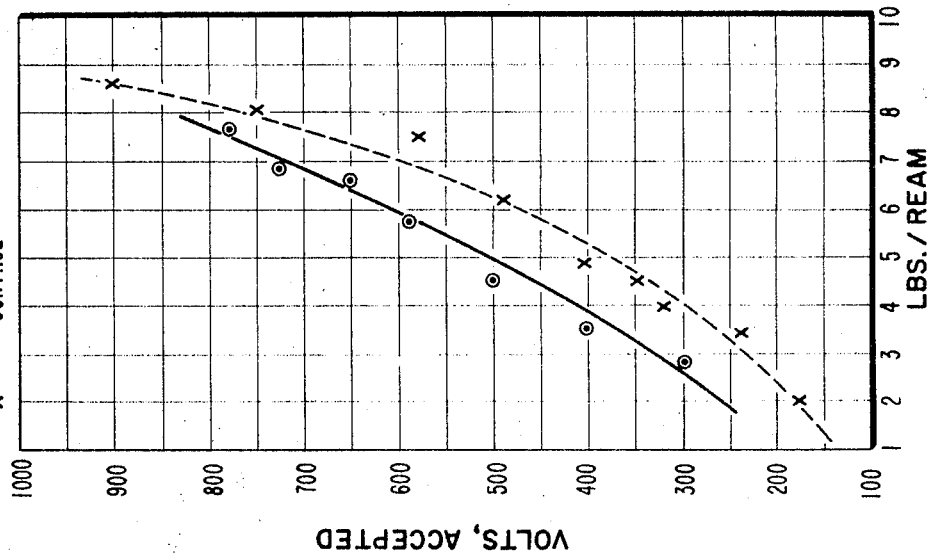
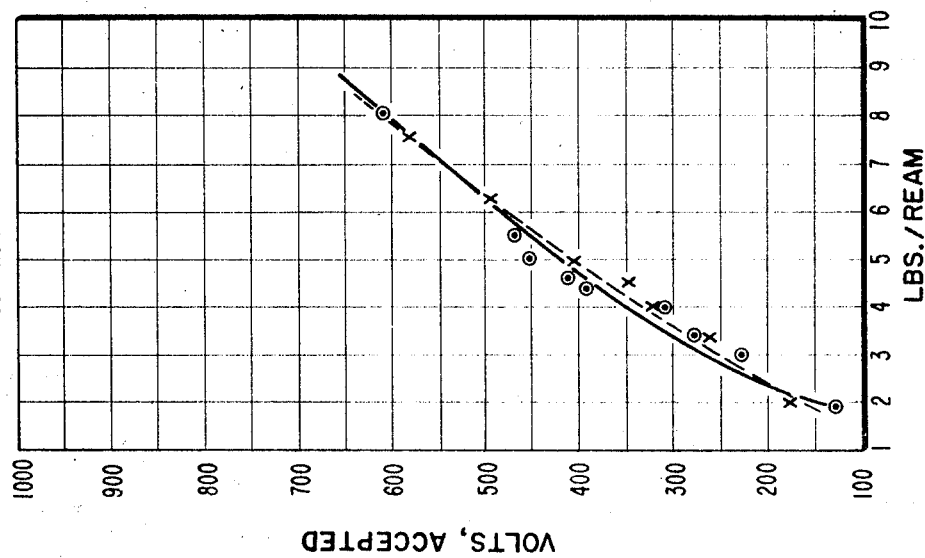
INVENTOR
ALBERT J. COLE

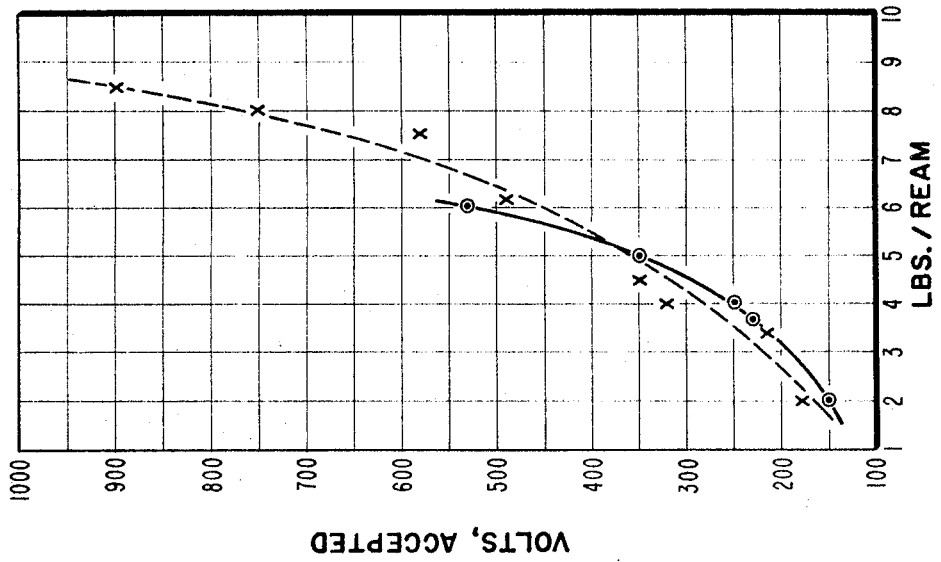
FIG. IV.
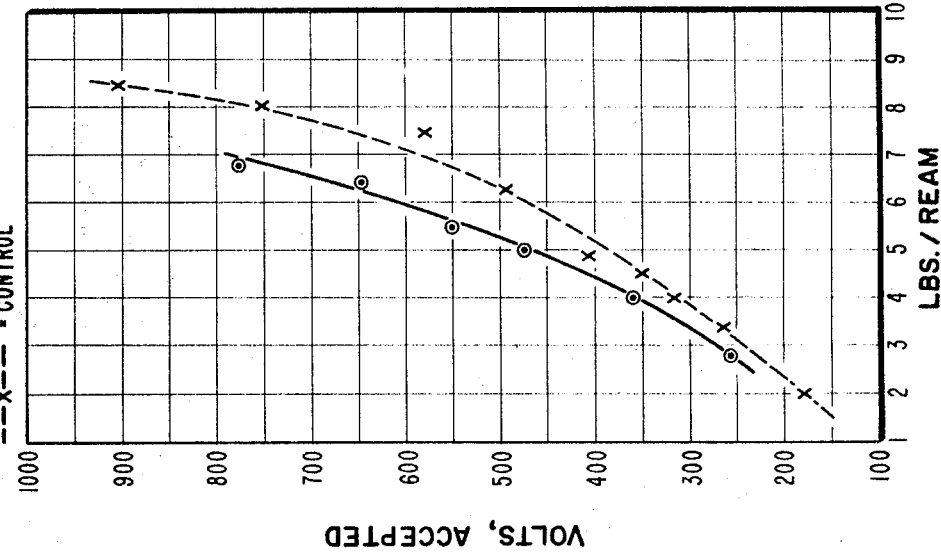
FIG. III.
INVENTOR
ALBERT J. COLE

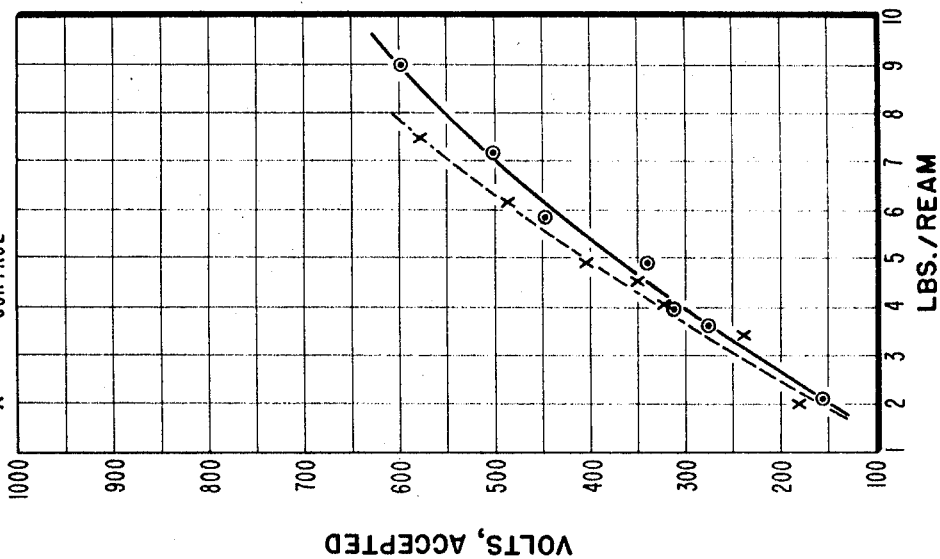
FIG. VI.
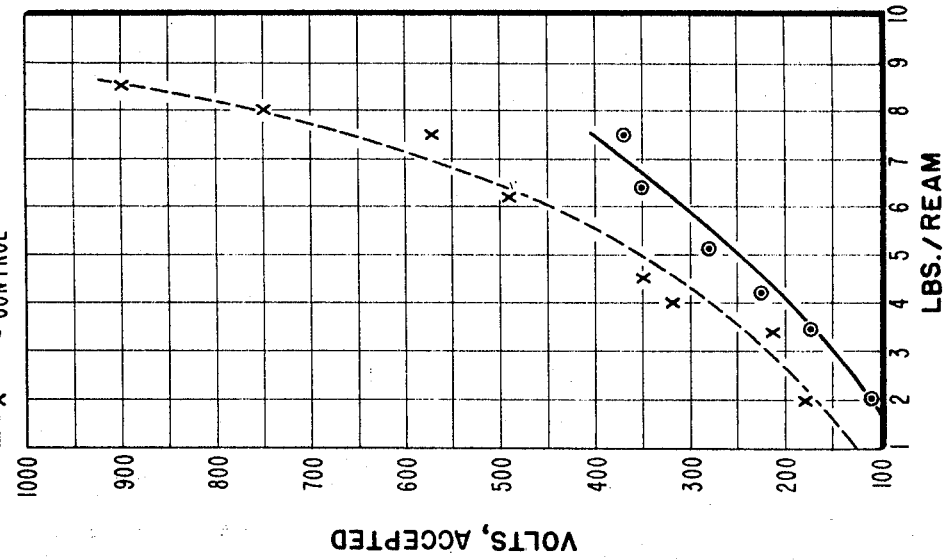
FIG. V.

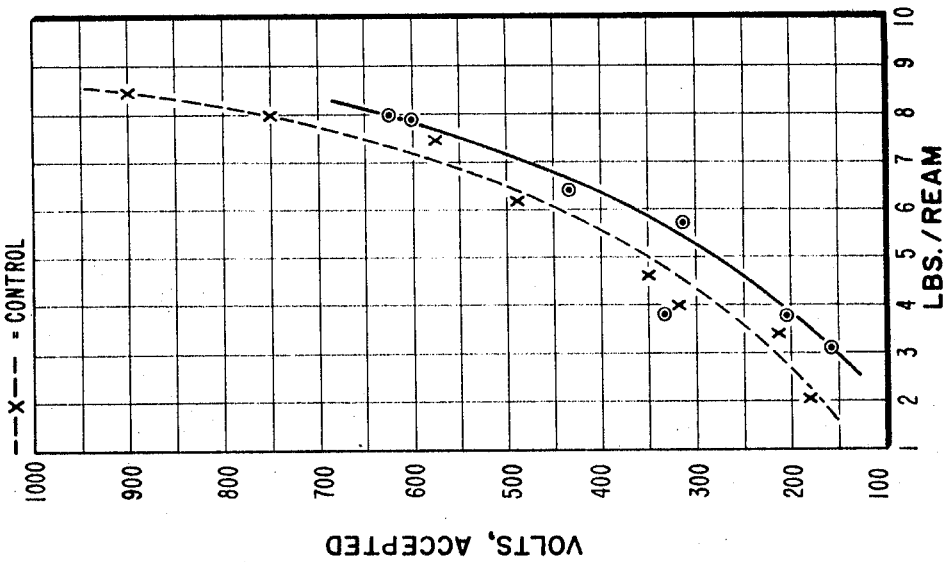
FIG. VIII.
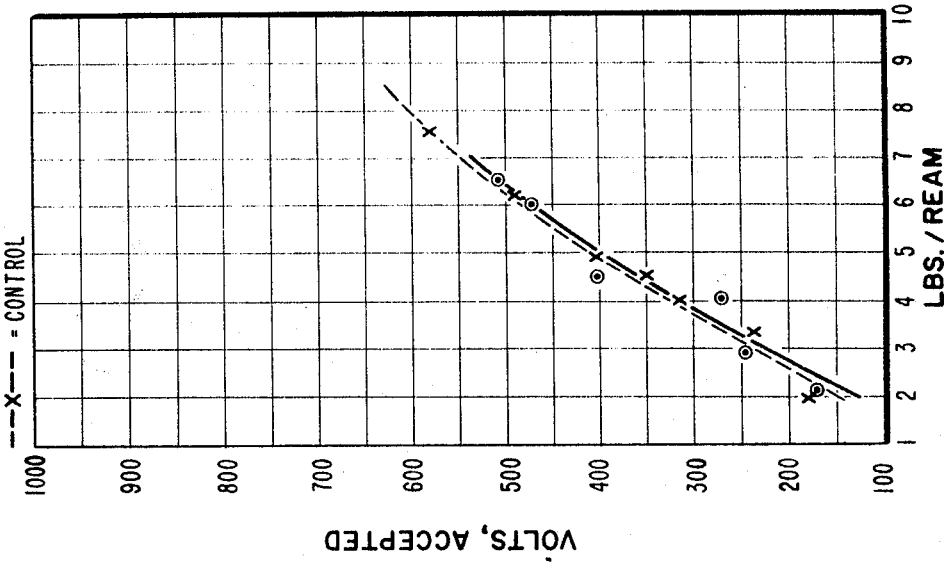
FIG. VII.

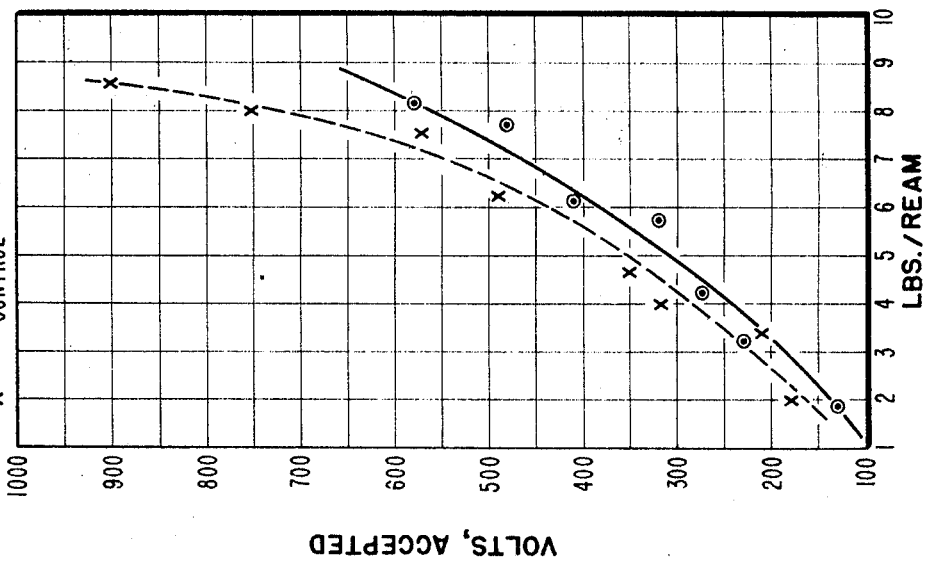
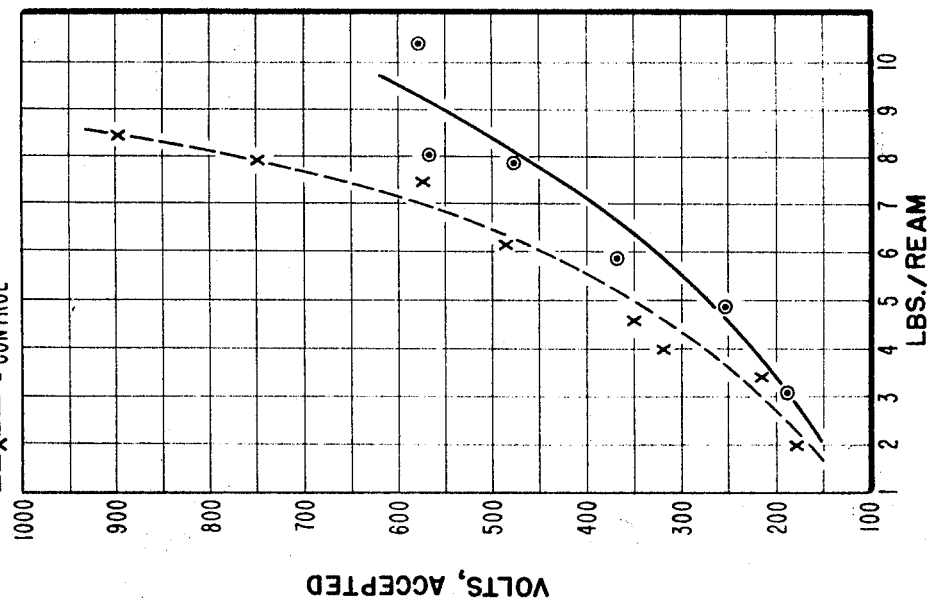

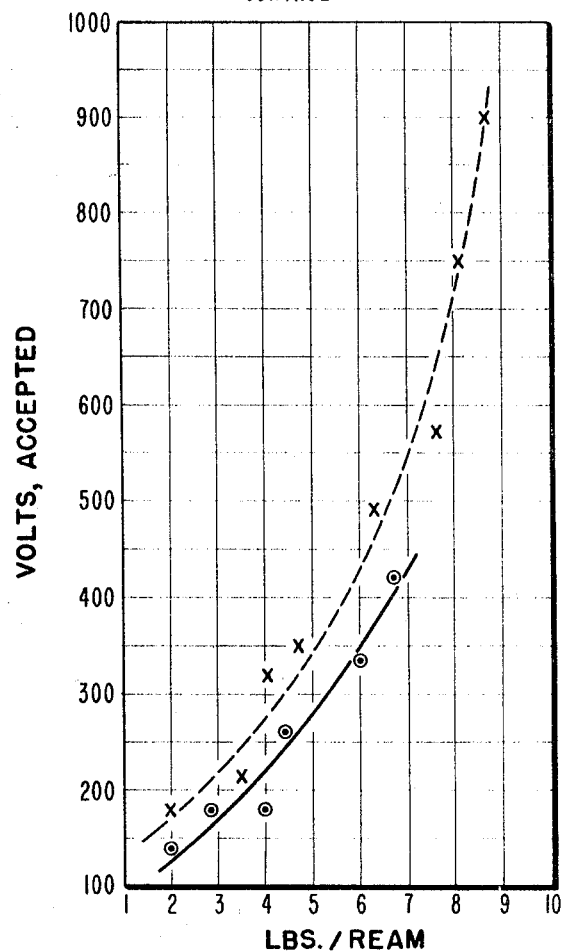

United States Patent Office 3,459,593

Patented Aug. 5, 1969

1

3,459,593
NONBLOCKING ELECTROSTATIC SHEETS

Albert J. Cole, New Hanover Township, Pa., assignor to The Firestone Tire & Rubber Company, Akron, Ohio, a corporation of Ohio Filed May 25, 1966, Ser. No. 552,735

Int. Cl. C09d *3/60;* C08d *13/16*

U.S. Cl. 117—201 12 Claims

ABSTRACT OF THE DISCLOSURE

A nonblocking sheet for use in electrostatic dry copying has a front coating for receiving the electrostatic image charge consisting of an interpolymer containing a conjugated diolefin in an amount of at least 18% by weight, up to 75% by weight of a monovinyl aromatic compound and 2 to 30% by weight of shellac. Up to about two-thirds of the diolefin may be replaced by vinyl or vinylidene monomers but should comprise no more than about 25% by weight of the total monomer charge. The coating also contains as an antiblocking agent, a microcrystalline addition polymer of ethylenically unsaturated monomers or resol condensation resin, the ratio of antiblocking to coating solids being from 5 to 50%. The reverse side of the sheet may also have a coating containing a water soluble ionizable metal salt and an antiblocking agent to enhance the antiblocking properties of the sheet.

This invention relates to a sheet for use in a dry copy process wherein electronic principles are employed to obtain a reproduction of configurations appearing on an original. More particularly, this invention deals with a copy sheet which is adapted to receive and hold an electrostatic charge transferred to form an invisible image on the surface thereof and which makes use of such image in the development of good and readable copies, and which sheets will not stick together when stacked or wound in rolls.

It has been found that certain shellac interpolymers have excellent electrical properties and are very useful as dielectric mediums for static charge acceptance materials, such as those used in videograph and other types of nonrepetitive printing processes. These interpolymers are polymers of shellac with conjugated diolefin and monovinyl aromatic compounds.

The conjugated diolefins used in this invention are butadiene-1,3, isoprene, chloroprene, pentadiene-1,3, piperylene and mixtures thereof. The conjugated diolefin may be separately polymerized with the shellac, or an admixture of the vinyl aromatic compound and the conjugated diolefin in the proportions desired may be copolymerized with the shellac.

The vinyl aromatic compounds used in this invention are styrene, alpha-methyl styrene, alpha-chlorostyrene and the corresponding halo and methyl nuclear substituted derivatives thereof such as the vinyl toluenes, p-chlorostyrene, etc. Mixtures of the vinyl aromatic compounds may be used.

The interpolymers used in the instant invention contain conjugated diolefin in an amount of at least about 18 percent by weight, up to 75 percent by weight of a monovinyl aromatic compound and 2 to 30 percent by weight of shellac. The polymers can be prepared by emulsion polymerization in an aqueous emulsion system containing the monomers in the corresponding proportions. The preferred conjugated diolefin is butadiene-1,3. The preferred monovinyl aromatic compound is styrene, although alpha-methyl styrene and alpha-chlorostyrene may also be suitably employed. The shellac is normally introduced in

2 the form of a solubilized shellac, e.g., ammonia or borax-treated shellac.

Optionally, minor amounts of copolymerizable vinyl or vinylidene monomers may be substiuted for the conjugated diolefin portion of the polymerization charge. Up to about two-thirds of the diolefin charge may be replaced by such vinyl or vinylidene monomers but should comprise no more than about 25 percent by weight of the total monomer charge. Examples of such vinyl or vinylidene monomers are methyl isopropenyl ketone, divinyl benzene, vinylidene chloride, acrylonitrile, acrylamide, alkyl acrylates such as butyl acrylate, alkyl methacrylates such as methyl methacrylate, etc. Such monomers should, of course, be selected to insure that they do not react deleteriously with other components of the latex. Divinyl benzene, in many respects, acts like, and has often been treated by the art, as an equivalent of a conjugated diolefin. As a result, divinyl benzene can generally be included in the polymerization charge in somewhat greater quantities than the other vinyl and vinylidene monomers. It should not, however, replace more than two-thirds of the conjugated diolefin in the polymerization charge.

For the purposes of the present invention, the preferred polymer contains as the nonshellac portion thereof, from about 20 to about 40 percent conjugated diolefin and from about 80 to about 60 percent monovinyl aromatic compounds with the shellac comprising about 5 to 15 percent of the total polymer. Thus, one particular composition found suitable comprises about 10 percent shellac with the remaining 90 percent comprising about 30 percent butadiene and 70 percent styrene.

Methods of making these interpolymers are more fully described in the copending application of Floyd L. Edris, Ser. No. 504,086, filed Oct. 23, 1965, now Patent No. 3,291,766.

These interpolymers exhibit high charge acceptance and a low rate of charge decay. In addition a coating of these polymers possesses other properties important in a charge-accepting sheet, such as nonpenetration of liquid toner dispersement, minimum curl of a paper substrate, etc. The use of these polymers is limited, however, due to the inherent blocking or sticking together of sheets which have been coated with these polymers when the sheets are stacked or wound in rolls. This problem arises when the polymer is coated on a conductive material such as aluminum foil, a nonconductive material such as glass or polyethylene, or a semiconductor such as paper.

The use of antiblocking agents for resinous films is well known. However, such antiblocking agents are not, as a class, acceptable for use in the resinous coating of electrostatic duplication papers. The coated surface of such papers must be capable of accepting and holding an electrostatic charge. Even minor quantities of ionizable material, capable of migration under conditions of relatively high humidity, are detrimental to the performance of the duplication paper.

It has now been found that certain materials may be compounded into the raw coating material, normally a latex, before it is applied to the desired substrate. After applying the raw coating material containing these materials to the desired substrate, drying, and application of heat and pressure, coated sheets are produced which are substantially free of blocking with adjacent sheets, particularly in the case of face-to-back sheet stacking.

It has further been found that any of the known antiblocking agents for resinous films can also be employed, but only if incorporated into the back conductive coating. Such materials do not interfere with the conductive coating, but in face-to-back stacking with like papers, will substantially eliminate the blocking tendency caused by the resinous front dielectric coating. The preferred duplication papers in accordance with the present invention incorporate treating agents in both the front dielectric coating and the back conductive coating.

The materials which are incorporated into the front, resinous, dielectric coating must not only prevent the undesired sticking or blocking, but must do so without detracting substantially from electric charge acceptance by the coating. The additives employed herein not only satisfy these requirements, but in some cases, actually enhance the charge-accepting capability of the resinous coating into which they are introduced. The additives which, in accordance with the present invention, may be included in the front resinous dielectric coating of electrostatic-type duplication papers, are encompassed by two classes of polymeric resinous materials: (1) polymers of monomers having terminal ethylenic unsaturation, and (2) "A" stage (resol) condensation resins of formaldehyde.

The first class of polymeric additives is further characterized as being the result of the addition polymerization of certain ethylenically unsaturated monomers to an intermediate molecular weight, i.e., to a molecular weight range corresponding to that characteristic of microcrystalline waxes and such that the melting points and viscosities of the polymers are substantially higher in the corresponding properties for the paraffin waxes. The monomers which may be employed in the production of polymeric addition agents are characterized by terminal ethylenic unsaturation. Thus, the resulting addition polymers will be further characterized by a carbon backbone to which various pendant groups may be attached. In general, the degree of polymerization necessary to obtain a microcrystalline wax will be of the same order of magnitude for all of these monomers, i.e., the length of the carbon backbone is generally determinative of the molecular weight necessary for the formation of a microcrystalline wax-type structure. Obviously, however, the wax, number and character of the pendant groups will increase or decrease the tendency of the material to assume the microcrystalline wax structure. Such variations are understood by the art and need not be further elaborated. It is to be understood, therefore, that in referring to microcrystalline waxes in the present application, it is intended to designate the physical form of the polymer which corresponds to a specific molecular weight of that polymer rather than to designate a single molecular weight broadly applicable to all polymers.

Typical monomers, which may be polymerized to microcrystalline waxes for use in the present invention, include the various alpha-olefins such as ethylene, propylene, etc. In general, the straight chain olefins are preferred to the branched olefins but this is not a critical limitation in the present invention.

Another group quite useful are the various vinyl and vinylidene monomers such as the vinyl and vinylidene halides, e.g., chlorides and acetates and the various vinyl aromatic compounds such as styrene, alpha-methyl styrene, as well as the various nuclear-substituted styrene derivatives. Of course, it is possible to employ either homopolymers of these monomers or interpolymers of mixtures of such monomers. Thus, typically, polystyrene, polyethylene, polypropylene, polyvinyl chloride, polyvinylidene chloride and the like polymers which have been polymerized to a microcrystalline wax-type structure may be employed in accordance with the present invention.

The second class of polymeric resinous materials, which may be incorporated into the front resinous dielectric coating, represented by the condensation resins of formaldehyde with nitrogen-containing organic compounds are polyfunctional in active hydrogen. Specifically, the condensation polymers of formaldehyde with urea, thiourea and/or melamine find particular use in the present invention. In this instance, however, the additive should be polymerized only through the "A" stage, i.e., to a resol, for ease of introduction and application into the front coating. Upon appropriate processing of the coated paper, as by heat and pressure, the condensation reaction will proceed further in situ such that the contained resin will be converted at least to the "B" stage water-insoluble form.

As employed throughout the present specification, the term "active hydrogen" is employed in accordance with the standard Zerevitinov test. A material having active hydrogens or groups containing active hydrogens will exhibit a positive Zerevitinov test.

Depending upon the particular conditions, such as heat and pressure and static charge acceptance needed, ratio of antiblocking materials to coating solids may vary from five to fifty percent. Since blocking characteristics and electrical charge acceptance may vary widely, depending upon the particular use of the sheet and type of substrate employed, a wide variation is possible. In all cases in which antiblocking agent is incorporated into the dielectric coating, soluble or ionizable salts, wetting agents, or soaps must be kept to a minimum.

Many compounds, other than the above-disclosed resinous polymeric materials, including common antiblocking agents such as colloidal silica, clay starch, polyvinyl alcohol, silicones, polyethylene emulsions, etc., were introduced into the shellac interpolymer dielectric coating. While many proved useful to reduce blocking, they detracted so greatly from the charge acceptance and/or nonpenetration of toner requirements that acceptable electrostatic copy sheets could not be prepared.

A different approach may be employed which permits the use not only of the polymeric additives discussed above, but also of the common antiblocking agents known to the art. In this technique, instead of including the agents in the front resinous coating, the additives are incorporated in the back conductive coating. It has been found that the common antiblocking agents, as well as the additives discussed for inclusion in the front coating, do not interfere with the conductive properties of the back coating. In addition, they reduce or eliminate the tendency of the sheets to block when placed in the normal front-to-back stacking arrangement. Accordingly, in addition to the microcrystalline waxes and resols discussed above, materials such as colloidal silica, ammonium salts of synthetic resin complexes, cationic wetting agents, silicones and polyethylene emulsions may also be used in the back coating.

It has further been found that treatment of both the front dielectric coating and the back conductive coating is more efficacious than treatment of either coating alone, although treatment of a single coating is quite adequate for many purposes. When both front and back coatings are treated, there is no necessity that the treating agents be the same. Thus, one of the previously discussed microcrystalline waxes may be incorporated in the front coating while colloidal silica may be incorporated in the back coating. It should also be noted, however, that there is no objection to incorporating the identical treating agents in both front and back coating provided the other requirements discussed previously are observed.

By the use of the various combinations of treating agents in either the dielectric coating, the conductive coating, or both, in the prescribed amounts, the tendency to block has been substantially eliminated, while the sheets which do not contain a treating agent in either coating show a high degree of adhesion. Blocking is measured by aligning four inch by four inch samples of coated paper in a face-to-back relationship between a pair of three inch diameter circular, parallel steel blocks. Uncoated cellophane is placed in direct contact with the steel blocks, and the assembly is placed under a pressure of 105 pounds (15 pounds per square inch.) The test blocks, samples and pressure device are contained in an oven from one to seven days, and tests are run at various temperatures from 100° F. to 125° F., at a relative humidity of from 60 to 70%. After the testing assembly has been in the oven for the desired period of time, it is removed and disassembled and the sheets are stripped apart. If the sheets fall apart readily, there is no blocking; if the sheets adhere together in any area, blocking is observed; and if the sheets become attached to the extent that a slight tearing noise, or "singing," is evident as the sheets are pulled apart, a "singing block" is observed. As an example, with the resinous coating used in all of the examples, containing 5 parts microcrystalline polyethylene per 100 parts dry resin, tested at 100° F. for 24 hours and at 15 pounds per square inch pressure, a "singing block" was observed. With higher percentages of microcrystalline polyethylene, no attachment of the sheets whatsoever was observed.

The invention will be better understood from the examples which follow. Examples I through V illustrate treatment of the dielectric coating alone. Examples VII through XI illustrate treatment of the conductive coating alone. Example VI illustrates treatment of both dielectric and conductive coatings. In all cases, the resinous coating on the coated paper was a butadiene-styrene-shellac interpolymer comprising 25 parts of butadiene, 67 parts styrene and 8 parts of shellac. The dielectric coating weight varied from 1.9 to 8.0 pounds per ream.

EXAMPLE I—FIGURE I

Five grams of a microcrystalline polyethylene resin were added to 125 grams of latex of an aqueous butadiene-styrene-shellac interpolymer latex. The latex contained 50 grams of (40 percent) solids. The mixture was milled gently for four hours in order to completely disperse the solids and then coated upon the felted side of No. 16 carbonized bond paper sheets using conventional coating equipment, i.e., air knife, wire-wound rod, etc. The coating was dried at 110° C. to 120° C. for two minutes. Following this, a back coating of ten grams potassium chloride, 25 grams of glycerin, and 65 grams of water was applied to the wire side of the paper at the rate of four pounds per ream, after which the paper was again dried. The coated sheet was then conditioned for twenty-four hours at 50 percent relative humidity and 72° F. to 74° F., after which time the measurements of charge acceptance and decay were made. The charge acceptance and decay test were performed in accordance with the method set forth in the Journal of the Technical Association of the Pulp and Paper Industry (TAPPI) for December 1965 at page 85. Tests for liquid toner dispersing preparation and blocking were also made. The penetration test of liquid toner was made by placing a drop of Shelsol 71 on the latex-polymer coated side and visually observing the penetration into the substrate. About one-tenth of one percent Brilliant Oil Blue BMA was added to the Shelsol in order to more easily discern penetration. No substantial penetration of liquid toner was observed in any of the sheets prepared in accordance with any of the examples. Blocking tests were made at various temperatures at 15 pounds per square inch pressure. Concurrently a control using the same dielectric coating without treating agents was also run.

FIGURE I shows the static charge accepted in volts, plotted against the pounds per ream of coating used for both the coated sheets containing the treating agent and the control sheets. It is readily apparent from FIGURE I that the treating agent does not detract from the charge acceptance. The sheets coated with the resin containing treating agent exhibited substantially no blocking, while sheets coated with the resin containing no treating agent adhered together.

EXAMPLE II—FIGURE II

Paper sheets were prepared and tested following the identical procedures used in Example I, using as a dielectric coating medium a latex containing about 40 percent solids (about 85 grams) into which about 15 grams of resol melamine formaldehyde resin had been incorporated. The back coating was the same as in Example I.

FIGURE II shows that there was no substantial decrease in charge-acceptance properties of the paper sheets coated with the melamine formaldehyde containing resin, compared to the control. These sheets exhibited substantially no blocking.

EXAMPLE III—FIGURE III

Paper sheets were prepared and tested following the same procedures used in Example I, using as a dielectric coating medium, a latex containing 36.7 percent solids (about 246 grams total latex and about 70 grams solids) into which was incorporated 30 grams of resol urea formaldehyde resin. The back coating was identical to that used in Example I.

FIGURE III shows that the paper coated with the resin containing the resol exhibited an increase in charge acceptance properties compared with paper coated with the same resin absent the resol. The paper coated with the resin containing the resol exhibited substantially no blocking.

EXAMPLE IV—FIGURE IV

Paper sheets were prepared and tested following the procedures used in Example I, using as a dielectric coating medium a latex containing 39.9 percent solids (about 90.0 grams solids in 224 grams total latex) into which about 10 grams of styrene powder were incorporated. The back coating was the same as that used in Example I.

FIGURE IV shows that there was no substantial decrease charge-acceptance properties of the paper coated with the resin containing the styrene powder, compared to the control. Paper coated with the styrene powder-containing polymers exhibited substantially no blocking.

EXAMPLE V—FIGURE V

Paper sheets were prepared and tested using the same procedure used in Example I, using as a dielectric coating medium a 40 percent solids latex (about 90 grams solids in 225 grams total latex) into which about 10.0 grams of polyvinyl chloride powder were incorporated. The back coating was the same as that used in Example I.

FIGURE V shows that there was no substantial decrease in the charge-acceptance properties of the sheets coated with the resin containing the treating agent, compared to the control. The paper containing the polyvinyl chloride powder exhibited substantially no blocking.

EXAMPLE VI—FIGURE VI

Paper sheets were prepared using the same procedures and the same microcrystalline polyethylene containing latex used in Example I. After the dielectric coating was dried, a back coating, prepared from a potassium chloride-glycerin solution containing 7.0 grams solids, admixed with 25.0 grams of a 30 percent colloidal silica emulsion (7.5 grams solids), was applied to the wire side of the paper at the rate of about four pounds per ream, and the paper was again dried. After conditioning the paper in the manner described in Example I, the paper was tested following the same test procedures used in Example I.

FIGURE VI shows that there is no substantial decrease in charge-acceptance properties of the paper containing agents in both the front and back coating, compared to the control which did not contain a treating agent in either coating. The paper containing agents in both front and back coating exhibited substantially no blocking.

EXAMPLE VII—FIGURE VII

Paper sheets were prepared and tested using the procedures of Example I, using a butadiene-styrene-shellac interpolymer as the dielectric coating. The back sides of the sheets were coated with a potassium chloride-glycerin solution containing 7.0 grams of solids, admixed with 25 grams of a 30 percent colloidal silica emulsion (7.5 grams solids) at the rate of about four pounds per ream.

FIGURE VII shows that there was no substantial decrease in the charge-acceptance properties of the paper containing the colloidal silica in the back coating, compared to the identical coated paper which did not contain the colloidal silica. The paper containing the colloidal silica in the back coating exhibited substantially no blocking.

EXAMPLE VIII—FIGURE VIII

Paper sheets coated on one side with a butadiene-styrene-shellac polymer were prepared using the same process used in Example I. A back coating of a 35 percent solids potassium chloride-glycerin solution (about 11.0 grams solids) to which was added 2.5 grams of an ammonium salt of a synthetic resin complex was applied at about the rate of four pounds per ream, using the method used in Example I. The resultant sheet was tested, using the same procedures used in Example I.

FIGURE VIII shows that there was no substantial decrease in the charge-acceptance properties of the paper containing the ammonia salt in the back coating, compared to the identical coated paper which did not contain the ammonia salt. The paper containing the ammonia salt in the back coating exhibited substantially no blocking.

EXAMPLE IX—FIGURE IX

Paper sheets were prepared and tested using the same procedures used in Example I. The dielectric coating was the same as that used in Example VIII, while the back coating was a 35 percent solids solution of potassium chloride-glycerin (about 11.0 grams solids) to which was added 2.5 grams of a cationic wetting agent. The back coating was applied at the rate of about four pounds per ream.

FIGURE IX shows that there was no substantial decrease in the charge-acceptance properties of the paper containing the cationic wetting agent in the back coating, compared to the identical coated paper which did not contain the cationic wetting agent. The paper containing the cationic wetting agent exhibited substantially no blocking.

EXAMPLE X—FIGURE X

Paper sheets were prepared and tested using the same procedures used in Example I. The dielectric coating was the same as that used in Example VIII, while the back coating was a 35 percent solids potassium chloride-glycerin solution (about 11.0 grams solids), to which 2.5 grams of a silicone emulsion had been added. The back coating was applied at the rate of about four pounds per ream.

FIGURE X shows that there was no substantial decrease in the charge-acceptance properties of the paper containing the silicone emulsion in the back coating, compared to the untreated coated paper. The paper containing the silicone emulsion exhibited substantially no blocking.

EXAMPLE XI—FIGURE XI

Paper sheets were prepared and tested using the same procedures used in Example I. The dielectric coating was the same as that used in Example VIII, while the back coating was a 35 percent solids potassium chloride-glycerin solution (about 11.0 grams solids), to which 2.5 grams of a polyethylene emulsion had been added. The back coating was applied at the rate of about four pounds per ream.

FIGURE XI shows that there was no substantial decrease in the charge-acceptance properties of the paper containing the polyethylene emulsion in the back coating, compared to the identical coated paper which did not contain the polyethylene emulsion. The paper containing the polyethylene emulsion exhibited substantially no blocking.

It will be appreciated that the above examples are merely illustrative and many variations will be readily apparent to one skilled in the art.

In the above examples, the microcrystalline polyethylene resin used was Microthene Polyethylene Resin, FN–500 (U.S. Industrial Chemicals), a powdered polyethylene of spherical shape, having a uniform particle size of less than 20 microns, a density of 0.915 g./cc. and an average molecular weight of 25,000 to 38,000; the malamine formaldehyde resin used was Cymel 7279 (American Cyanamid Co.), a powder which is soluble in water in concentrations from 30 to 65 percent at 80° F. and which cures at 250° to 300° F.; the urea formaldehyde resin used was Beetle 7285 (American Cyanamid Co.), a pure resin, in a powder form which readily forms dispersions in water, and which cures readily in the range of 250° to 300° F.; the colloidal silica used Ludox AM (Du Pont); the ammonium salt of a synthetic resin complex used was Amberlac-165 (Rohm and Haas Co.), available as an aqueous solution having a light-yellow appearance, a nonvolatile content of 21–22 percent and a pH of 9.0; the cationic wetting agent used was Ethoquad C/25 (Armour Co.), a cationic quaternary ammonium compound of the general formula:

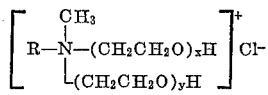

in which R is a coconut acid residue consisting of $C_{10}$, $C_{12}$ and $C_{14}$ mixed acids and $x+y$ equals 15; the silicon emulsion used was Silicon Emulsion C (Dow-Corning); the polyethylene emulsion used was Poly-Em 550 Emulsion (Spencer Chemical Corp.), having an average molecular weight of 15,000 to 30,000 and a melting point of about 200° F.; the polyvinyl chloride used was a specialty latex having a particle size of 0.05 to 0.1 micron and average molecular weight of about 100,000; and the polystyrene used was a specialty latex having a particle size of about 0.07 micron and an average molecular weight of about 50,000.

While all of the examples shown are specific to a back coating containing potassium chloride, many other water-soluble, ionizable metal salts may be used, such as barium chloride, cupric sulfate, ferric ammonium citrate, ferrous sulfate, sodium sulfate, aluminum sulfate, sodium hypophosphite, potassium nitrate, potassium carbonate, ferric citrate, potassium phosphate, potassium dihydrogen phosphate, potassium bisulfate, sodium carbonate, monohydrate, sodium dichromate, sodium citrate, sodium dihydrogen phosphate, sodium metasilicate, sodium thiosulfate and disodium phosphate. The salts used should be water soluble, somewhat hydroscopic and capable of ionic migration. The glycerin acts as a humectant in order to assure that a certain amount of moisture is present under a wide range of humidities, thus permitting ionic migration.

It will also be appreciated that the water-soluble ionizable salt may be incorporated in the paper base sheets as components of the fiber slurry from which the paper sheet is formed. However, it is preferred to incorporate the water-soluble ionizable salt by suitable treatment of the paper after it is formed, such as impregnating the paper with an aqueous solution of the salt. Impregnation may be accomplished by conventional coating or impregnating processes, such as a dip-squeeze process, a roller coater process, a spray coating process or the like, using a liquid system containing the salt solution.

I claim:
1. A sheet for use in receiving an electrostatic latent image comprising a substrate having a front coating, said front coating comprising a continuous dielectric insulating resinous material, said resinous material consisting of:
 (a) from 2 to 30% by weight of shellac,
 (b) up to 75% by weight of monovinyl aromatic compounds,
 (c) up to 25% by weight of copolymerizable vinyl or vinylidene monomers, and
 (d) the balance consisting of conjugated diolefins, the aggregate amount of (c) comprising less than about twice the diolefin monomer content of said polymer, the aggregate of (c) and (d) in said polymer comprising at least 18% by weight of said polymer, said interpolymer containing a polymeric resinous antiblocking agent dispersed therein, said antiblocking agent selected from the group consisting of the intermediate molecular weight microcrystalline addition polymers of ethylenically unsaturated monomers and resol condensation resins of formaldehyde and polyfunctional nitrogen containing compounds, and the ratio of said antiblocking agent to solids in said coating being 5 to 50%.

2. The sheet of claim 1 in which said antiblocking agent is microcrystalline polyethylene.

3. The sheet of claim 2 in which said substrate is paper.

4. The sheet of claim 1 in which said antiblocking agent is a microcrystalline polyvinyl chloride.

5. The sheet of claim 1 in which said antiblocking agent is a microcrystalline polystyrene.

6. The sheet of claim 1 in which said antiblocking agent is resol urea formaldehyde.

7. The sheet of claim 1 in which said antiblocking agent is resol melamine formaldehyde.

8. The sheet of claim 1 in which said conjugated diolefins are selected from the group consisting of butadiene-1,3, isoprene, chloroprene, pentadiene-1,3, piperylene and mixtures thereof.

9. The sheet of claim 1 in which said monovinyl aromatic compounds are selected from the group consisting of styrene; alpha-methyl styrene; alpha-chlorostyrene; the halo and methyl nuclear substituted derivatives of styrene, alpha-methyl styrene, and alpha-chlorostyrene; and mixtures thereof.

10. A sheet for use in receiving an electrostatic latent image comprising, a substrate having a front coating and a back coating, said front coating comprising a continuous dielectric insulating resinous material, said resinous material consisting of an interpolymer consisting essentially of:
   (a) from 2 to 30% by weight of shellac,
   (b) up to 75% by weight of monovinyl aromatic compounds,
   (c) up to 25% by weight of copolymerizable vinyl or vinylidene monomers, and
   (d) the balance consisting of conjugated diolefins, the aggregate amount of (c) comprising less than about twice the diolefin monomer content of said polymer, the aggregate of (c) and (d) in said polymer comprising at least 18% by weight of said polymer, said interpolymer containing a polymeric resinous antiblocking agent dispersed therein, said antiblocking agent selected from the group consisting of the intermediate molecular weight microcrystalline addition polymers of ethylenically unsaturated monomers and resol condensation resins of formaldehyde and polyfunctional nitrogen containing compounds, and said back coating containing a water-soluble ionizable metal salt and an antiblocking agent, said antiblocking agent selected from the group consisting of high molecular weight crystalline addition polymers of ethylenically unsaturated monomers, resol condensation resins of formaldehyde and polyfunctional nitrogen containing compounds, colloidal silica, ammonia salts of synthetic resin complexes, cationic wetting agents, silicones, polyethylene emulsions, clay, starch and polyvinyl alcohol, and the ratio of said antiblocking agents to solids in said coatings being 5 to 50%.

11. The sheet of claim 10 in which said conjugated diolefins are selected from the group consisting of butadiene-1,3, isoprene, chloroprene, pentadiene-1,3, piperylene and mixtures thereof.

12. The sheet of claim 10 in which said monovinyl aromatic compounds are selected from the group consisting of styrene; alpha-methyl styrene; alpha-chlorostyrene; the halo and methyl nuclear substituted derivatives of styrene, alpha-methyl styrene, and alpha-chlorostyrene; and mixtures thereof.

References Cited
UNITED STATES PATENTS

| | | |
|---|---|---|
| 3,075,859 | 1/1963 | Relph et al. _____ 117—201 |
| 3,291,766 | 12/1966 | Edris _____ 260—27 |

FOREIGN PATENTS

| | | |
|---|---|---|
| 734,379 | 5/1966 | Canada. |

ALFRED L. LEAVITT, Primary Examiner

C. R. WILSON, Assistant Examiner

U.S. Cl. X.R.

117—68, 155, 161; 346—135